(12) United States Patent
Onimaru et al.

(10) Patent No.: US 12,536,848 B2
(45) Date of Patent: Jan. 27, 2026

(54) VEHICLE TRAVELING INFORMATION ANALYSIS DEVICE AND VEHICLE TRAVELING INFORMATION ANALYSIS METHOD

(71) Applicant: HONDA MOTOR CO., LTD., Tokyo (JP)

(72) Inventors: Hiroyuki Onimaru, Tokyo (JP); Takeo Tokunaga, Tokyo (JP); Atsuki Kakinuma, Tokyo (JP); Yasuo Oishi, Tokyo (JP); Akira Iihoshi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 18/691,039

(22) PCT Filed: Jul. 15, 2022

(86) PCT No.: PCT/JP2022/027841
§ 371 (c)(1),
(2) Date: Mar. 11, 2024

(87) PCT Pub. No.: WO2023/042539
PCT Pub. Date: Mar. 23, 2023

(65) Prior Publication Data
US 2025/0148841 A1    May 8, 2025

(30) Foreign Application Priority Data

Sep. 14, 2021  (JP) .................................. 2021-149586

(51) Int. Cl.
*G07C 5/02*   (2006.01)
*G06F 16/29*  (2019.01)
*G09B 29/10*  (2006.01)

(52) U.S. Cl.
CPC ............... *G07C 5/02* (2013.01); *G06F 16/29* (2019.01); *G09B 29/10* (2013.01)

(58) Field of Classification Search
CPC ............ G07C 5/02; G06F 16/29; G09B 29/10
(Continued)

(56) References Cited

U.S. PATENT DOCUMENTS 7,158,879 B2 *  1/2007  Tsuge ............... G08G 1/096811
                                                     348/211.3
9,176,924 B2 * 11/2015  Ricci .................. G06F 11/3013
(Continued)

FOREIGN PATENT DOCUMENTS

JP    H05189636 A    7/1993
JP    4978692 B2     7/2012
(Continued)

*Primary Examiner* — Andrew Joseph Rudy
(74) *Attorney, Agent, or Firm* — CKC & Partners Co., LLC

(57) ABSTRACT

A vehicle traveling information analysis device comprises: a reception unit that receives, from a plurality of vehicles, traveling information which includes location information and time information; a traveling information recording unit that stores, in a traveling information storage unit, the traveling information received from the reception unit together with identification information of vehicles; an analysis condition input unit that accepts, from a user, designation of an analysis condition which includes information pertaining to an analysis target road; an extraction region setting unit that sets extraction regions each having a predetermined area to a respective plurality of locations on a road map on the basis of the designated analysis condition; and a vehicle identification information extraction unit that extracts identification information of a vehicle having a
(Continued)

record of traveling information in all the extraction regions which have been respectively set to the plurality of locations on the road map.

6 Claims, 10 Drawing Sheets

(58) Field of Classification Search
USPC .......................................................... 701/29.3
See application file for complete search history.

(56) References Cited

U.S. PATENT DOCUMENTS

| | | | |
|---|---|---|---|
| 10,054,462 B2 * | 8/2018 | Sechny | G01C 21/3667 |
| 11,788,863 B2 * | 10/2023 | Chikamori | G01C 21/3859 |
| | | | 701/24 |

FOREIGN PATENT DOCUMENTS

| | | | |
|---|---|---|---|
| JP | 2017027461 A | 2/2017 |
| JP | 2020112910 A | 7/2020 |
| JP | 2020135821 A | 8/2020 |

\* cited by examiner

FIG. 5

| VEHICLE ID | TIME INFORMATION(1) | POSITION INFORMATION(1) | DIRECTION OF PROGRESSION(1) |
|---|---|---|---|
| | ............ | | |
| | TIME INFORMATION(i-1) | POSITION INFORMATION(i-1) | DIRECTION OF PROGRESSION(i-1) |
| | TIME INFORMATION(i) | POSITION INFORMATION(i) | DIRECTION OF PROGRESSION(i) |
| | TIME INFORMATION(i+1) | POSITION INFORMATION(i+1) | DIRECTION OF PROGRESSION(i+1) |
| | ............ | | |
| | TIME INFORMATION(N) | POSITION INFORMATION(N) | DIRECTION OF PROGRESSION(N) |

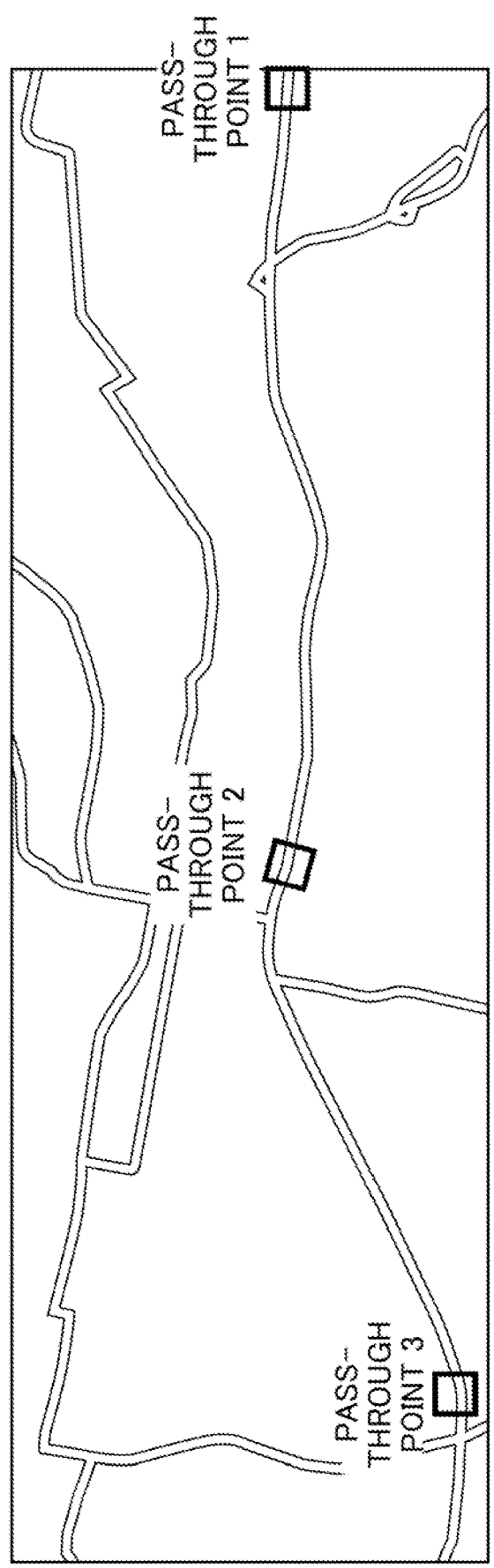

FIG. 7

| PASS-THROUGH POINT | ID : A | ID : B | ID : C | ID : D |
|---|---|---|---|---|
| 1 | 12:43 | 16:22 | 15:13 | 13:20 |
| 2 | 12:48 | 16:27 | 15:16 | 13:16 |
| 3 | 12:53 | 16:31 |  | 13:12 |
| EXTRACTION TARGET | ○ | ○ | × :NO PASS THROUGH | × :REVERSE DIRECTION |

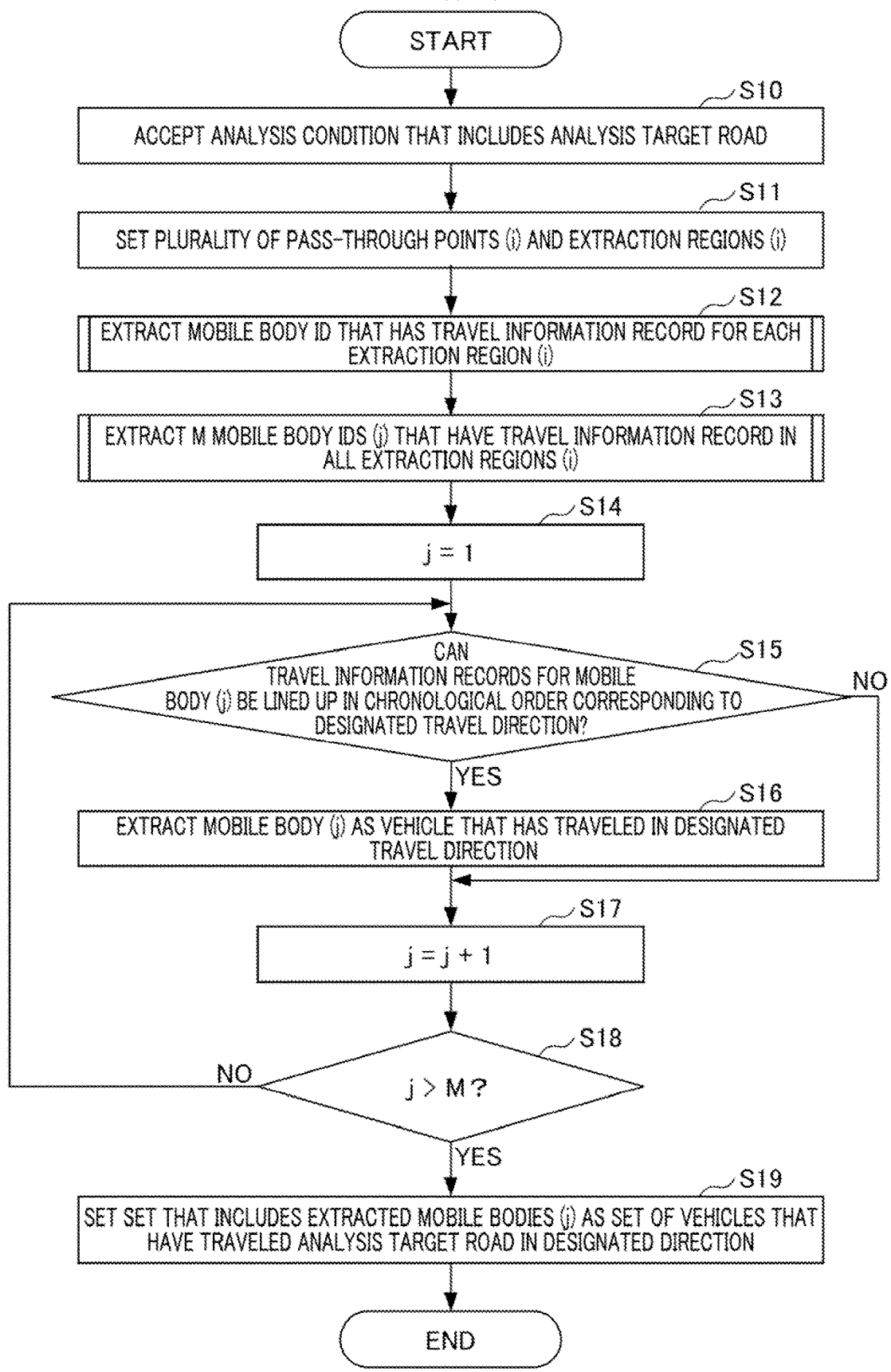

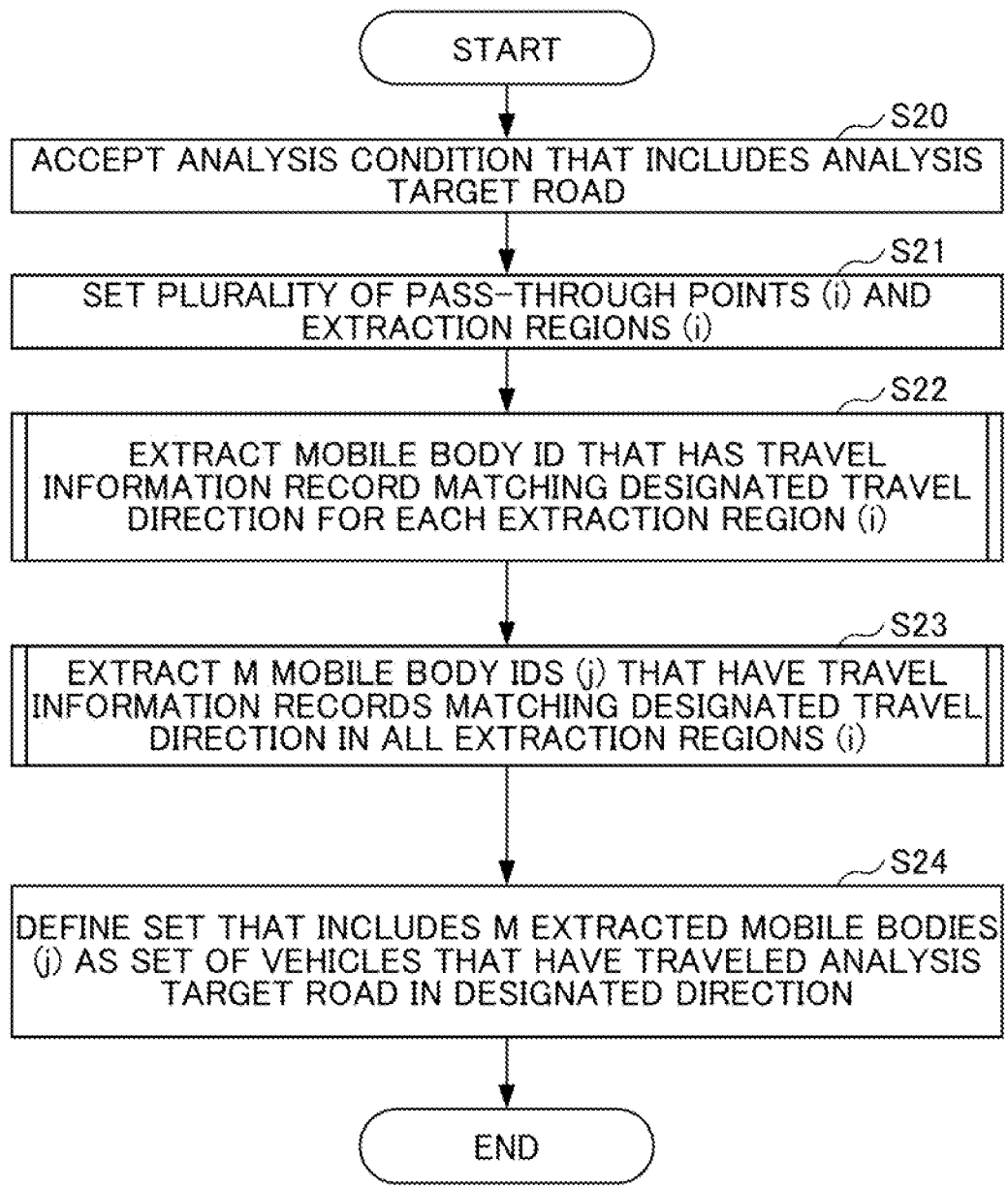

VEHICLE TRAVELING INFORMATION ANALYSIS DEVICE AND VEHICLE TRAVELING INFORMATION ANALYSIS METHOD

TECHNICAL FIELD

The present invention pertains to a vehicle travel information analysis device and a vehicle travel information analysis method that are for, based on position information from a plurality of vehicles and based on an analysis condition that includes analysis target road information, extracting and analyzing a vehicle that has traveled on an analysis target road.

BACKGROUND ART

Currently, the spread of vehicles that are equipped with a wireless communication function and are referred to as connected cars is proceeding, and various analysis services that use vehicle data obtained from vehicles are being deployed. In order to carry out these analysis services, it is necessary to accumulate, in a server, probe information that includes the current position of a vehicle, and extract probe information that is necessary at a time of analysis. In a case of, for each road, analyzing a plurality of traveling vehicles that travel on the road in particular, it is necessary to extract traveling vehicles in a road length or a road section—and also travel direction (inbound lane/outbound lane) in some cases—for which there is a desire to analyze from among a designated road. For example, Patent Document 1 discloses, as a map matching system, a technique for combining map-based grid cells that include roads to be passed through and, in a case where there is a large amount of event data that includes position information, a portion thereof is selected, whereby map matching is performed at high speed without dropping the accuracy of analysis, even if event data is transmitted from many vehicles. In addition, Patent Document 2 discloses a technique in which current location coordinates for a vehicle are obtained by a current location detection sensor in a navigation system and compared with a link number set in a road map in a map database, whereby current location information for the vehicle based on the link number is created and transmitted to a tachograph system. As a result, the tachograph system can accumulate information regarding a road traveled by a vehicle based on the link number.

CITATION LIST

Patent Document

Patent Document 1: Japanese Patent No. 4978692
Patent Document 2: Japanese Unexamined Patent Application, Publication No. H5-189636

DISCLOSURE OF THE INVENTION

Problems to be Solved by the Invention

The technique described in Patent Document 1 corrects error in measured position data to thereby make a correction to a nearby road position such that analysis is possible, but there is a high processing load to perform map matching on data that includes a large amount of position information, and implementation is difficult. In addition, the technique described in Patent Document 2 requires the use of a digital map that has been embedded with link information, using this map incurs a large cost burden on a user side, and implementation is difficult. In addition, there are also cases where there are no accurate road maps for which link numbers have been set in many countries. Accordingly, there is a requirement for a technique for extracting data regarding vehicles that have traveled a designated road without performing map matching that has a high processing load as described in Patent Document 1, or a technique for extracting data regarding vehicles that have traveled a designated road without using a digital map in which link information is embedded as described in Patent Document 2.

The present invention is made in the light of such problems, and an object of the present invention is to provide a vehicle travel information analysis device and a vehicle travel information analysis method that are for extracting data regarding vehicles that have traveled a designated road, by providing coordinate points (pass-through points) and regions that have a predetermined area and include the coordinate points (pass-through points) at a plurality of locations on a road map in association with a designated analysis target road and data regarding vehicles for which position information has been recorded at the plurality of regions is extracted, without performing map matching or using a map into which link information has been embedded.

Means for Solving the Problems (1) A vehicle travel information analysis device (for example, a vehicle travel information analysis device 30 described below) according to the present invention is provided with: a map information storage (for example, a map information storage unit 321 described below) configured to store map information that includes a road map; a travel information storage (for example, a travel information storage unit 322 described below) configured to store travel information for a vehicle; and a controller (for example, a control unit 31 described below), the controller being provided with a receiver (for example, a reception unit 311 described below) configured to receive, from a plurality of vehicles, travel information that includes position information and time information, a travel information recorder (for example, a travel information recording unit 312 described below) configured to store, in the travel information storage, the travel information received by the receiver together with vehicle identification information, an analysis condition inputter (for example, an analysis condition input unit 313 described below) configured to accept, from a user, a designation of an analysis condition that includes information regarding an analysis target road, an extraction region setter (for example, an extraction region setting unit 314 described below) configured to, based on the designation of the analysis condition accepted by the analysis condition inputter, set an extraction region that has a predetermined area to each of a plurality of locations on the road map, and a vehicle identification information extractor (for example, a vehicle identification information extraction unit 315 described below) configured to extract the identification information for the vehicles having a record of the travel information in all of the extraction regions that were respectively set to the plurality of locations on the road map by the extraction region setter.

By virtue of (1) above, it becomes possible to extract identification information for a vehicle that has traveled an analysis target road designated by a user, without performing map matching and without using a map into which link information has been embedded.

(2) In the vehicle travel information analysis device (for example, the vehicle travel information analysis device 30 described below) according to (1) above, it may be that the analysis condition inputter (for example, the analysis condition input unit 313 described below) further accepts, as the analysis condition, a designation of travel direction information that indicates a travel direction on the analysis target road, and the vehicle identification information extractor (for example, the vehicle identification information extraction unit 315 described below) further extracts identification information for the vehicle for which a chronological order of the time information included in the travel information matches the travel direction information, said vehicle having a chronological order that matches the travel direction information and having a record of the travel information in each extraction region.

By virtue of (2) above, it becomes possible to extract identification information for a vehicle that has traveled an analysis target road designated by a user in a designated travel direction (for example, an inbound direction or an outbound direction).

(3) In the vehicle travel information analysis device (for example, the vehicle travel information analysis device 30 described below) according to (1) above, it may be that the receiver (for example, the reception unit 311 described below) further receives, from the plurality of vehicles, the travel information that includes progression direction information indicating a direction of progression by the vehicle, the analysis condition inputter (for example, the analysis condition input unit 313 described below) further accepts, as the analysis condition, a designation of travel direction information that indicates a travel direction on the analysis target road, and the vehicle identification information extractor (for example, the vehicle identification information extraction unit 315 described below) further extracts identification information for the vehicle for which progression direction information included in travel information matches the travel direction information, said vehicle having the travel information that matches the travel direction information in each extraction region.

By virtue of (3) above, it becomes possible to extract identification information for a vehicle that has traveled an analysis target road designated by a user in a designated travel direction (for example, an inbound direction or an outbound direction).

(4) In the vehicle travel information analysis device (for example, the vehicle travel information analysis device 30 described below) according to (1) to (3) above, it may be that the analysis condition inputter (for example, the analysis condition input unit 313 described below) further designates information regarding the analysis target road by accepting, from a user, designation of road identification information as the analysis condition.

By virtue of (4) above, it becomes possible for a user to designate road identification information by, inter alia, designating a road name or using a mouse to click a road itself that is displayed on a road map, for example.

(5) In the vehicle travel information analysis device (for example, the vehicle travel information analysis device 30 described below) according to (1) to (3) above, it may be that the analysis condition inputter (for example, the analysis condition input unit 313 described below) further designates information regarding the analysis target road by accepting, from a user, designation of a start point and an end point of a road that is depicted on the road map as the analysis condition.

By virtue of (5) above, it becomes possible for a user to designate a predetermined section in a road depicted on a road map, instead of designating an analysis target road by using road identification information. For example, in a case of designating Japan National Route 1 as a road name, a road section from Tokyo to Osaka becomes an analysis target range, but a start point and an end point for the road depicted on a road map are designated, whereby it is possible to accurately designate an analysis target road that is desired by a user.

(6) A vehicle travel information analysis method according to the present invention is executed by one or more computers that include a map information storage (for example, the map information storage unit 321 described below) configured to store map information that includes a road map and a travel information storage (for example, the travel information storage unit 322 described below) configured to store travel information for a vehicle, the vehicle travel information analysis method having: a receiving step of receiving, from a plurality of vehicles, travel information that includes position information and time information; a travel information recording step of storing, in the travel information storage, the travel information received in the receiving step together with vehicle identification information; an analysis condition input step of accepting, from a user, a designation of an analysis condition that includes information regarding an analysis target road; an extraction region setting step of setting, based on the designation of the analysis condition accepted in the analysis condition input step, an extraction region that has a predetermined area to each of a plurality of locations on the road map; and a vehicle identification information extraction step of extracting the identification information for the vehicles having a record of the travel information in all of the extraction regions that were respectively set to the plurality of locations on the road map in the extraction region setting step.

By virtue of the method according to the abovementioned (6), a similar effect to the vehicle travel information analysis device according to the abovementioned (1) is achieved.

Effects of the Invention

By virtue of the present invention, it is possible to provide a vehicle travel information analysis device and a vehicle travel information analysis method that are for extracting data regarding vehicles that have traveled a designated road, by providing regions that have a predetermined area at a plurality of locations on a road map in association with the designated road and data regarding vehicles for which position information has been recorded at the plurality of regions is extracted, and without performing map matching or using a map into which link information has been embedded.

BRIEF DESCRIPTION OF THE DRAWINGS

FIG. 5 is a view that illustrates an example of a travel information data structure recorded to a travel information storage unit in an embodiment according to the present invention.

FIG. 6 is a view that illustrates an example of pass-through points and extraction regions that are set on an analysis target road, in an embodiment according to the present invention.

FIG. 7 is a view that exemplifies travel information (time information) for each pass-through point (extraction region) for each mobile body in a case where three pass-through points (extraction regions) are set on an analysis target road, in an embodiment according to the present invention.

FIG. 9 is a flow chart that illustrates operation in a case of extracting identification information for vehicles having a travel information record in each extraction region respectively set at a plurality of locations on a road map, in an embodiment according to the present invention.

FIG. 10 is a flow chart that illustrates operation in a case of extracting identification information for vehicles having a travel information record, for which the direction of progression by the vehicles matches a designated travel direction, in each extraction region respectively set at a plurality of locations on a road map, in an embodiment according to the present invention.

PREFERRED MODE FOR CARRYING OUT THE INVENTION

With reference to the drawings, description is given in detail below regarding a desirable embodiment of a vehicle travel information analysis system according to the present invention.

<Overall Configuration of Vehicle Travel Information Analysis System 1>

Figure 1:
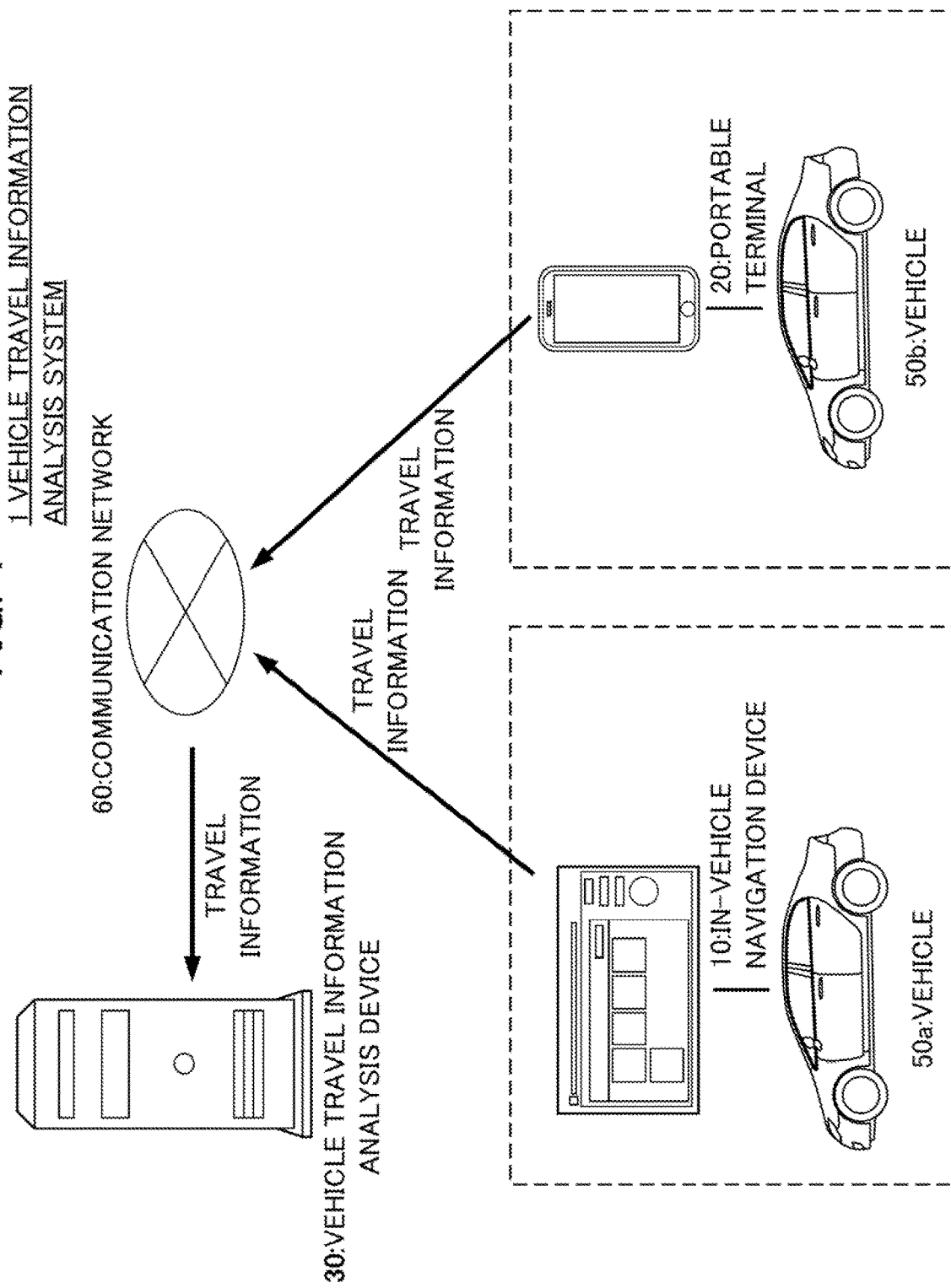
FIG. 1 is a block view illustrating a basic configuration of the entirety of a vehicle travel information analysis system, which is an embodiment according to the present invention.

Description is given regarding a vehicle travel information analysis system 1 according to a desirable embodiment of the present invention. FIG. 1 illustrates an overall configuration of the vehicle travel information analysis system 1.

As illustrated in FIG. 1, the vehicle travel information analysis system 1 is configured by including an in-vehicle navigation device 10, a portable terminal 20, and a vehicle travel information analysis device 30. These devices and terminals are connected via a communication network 60 in a manner that enables mutual communication. Note that although illustration is given in the drawings for information transmitted and received by these devices and terminals, but these items of information are purely examples. It may be that information other than that illustrated may be transmitted and received in the present embodiment.

The in-vehicle navigation device 10 performs navigation (route guidance) with respect to a user who is riding a vehicle 50a. In addition, the in-vehicle navigation device 10 has a function for positioning position information for the in-vehicle navigation device 10 (in other words, position information for the vehicle 50a). The in-vehicle navigation device 10, based on a request by a user who is riding the vehicle 50 and the positioned position information, performs route guidance from the current position to a destination.

In addition, the in-vehicle navigation device 10 transmits, as appropriate, travel information that includes positioned position information and positioned time information (also referred to as date and time information or a time stamp) together with a mobile body ID that is identification information for identifying the in-vehicle navigation device 10, to the vehicle travel information analysis device 30. Here, the in-vehicle navigation device 10 and the vehicle 50a are used as a one-to-one group, and thus the position information that is transmitted can be substantially treated as position information for the vehicle 50a. Note that, as described below, a mobile body ID may also be referred to as vehicle identification information. Such an in-vehicle navigation device 10 can be realized by a transportable car navigation device that is attached to the vehicle 50a that is a mobile body, or a PND (Portable Navigation Device) that is simply installed to the vehicle 50a that is a mobile body.

The portable terminal 20 is used by a user who is riding a vehicle 50b. Similarly to the in-vehicle navigation device 10 described above, the portable terminal 20 has a function for performing navigation (route guidance) or a function for positioning position information for the portable terminal 20 (in other words, position information for the vehicle 50b).

Similarly to the in-vehicle navigation device 10 described above, the portable terminal 20 transmits, as appropriate, travel information that includes positioned position information and positioned time information (also referred to as date and time information or a time stamp) together with a mobile body ID that is identification information for identifying the portable terminal 20, to the vehicle travel information analysis device 30. Here, the portable terminal 20 and the vehicle 50b are used as a one-to-one group, and thus transmitted travel information can be substantially treated as travel information for the vehicle 50b. Such a portable terminal 20 can be realized by a smartphone, a mobile telephone, a tablet terminal, a laptop computer, or other portable electronic device.

Note that the group of the in-vehicle navigation device 10 and the vehicle 50a and the group of the portable terminal 20 and the vehicle 50b are each illustrated as one group in the drawings, but there is no particular limitation to these numbers of groups, and the present embodiment may include an arbitrarily-defined number of these groups. Similarly, there is also no particular limitation regarding the number of vehicle travel information analysis devices 30, and the present embodiment may include an arbitrarily-defined number of vehicle travel information analysis devices 30.

In addition, in the following description, in a case of referring to the vehicle 50a in which the in-vehicle navigation device 10 is mounted or the vehicle 50b in which the user who uses the portable terminal 20 rides without distinguishing between the vehicle 50a and the vehicle 50b, the alphabetic character at the end is omitted, and a "vehicle 50" is simply referred to. Furthermore, the vehicle 50 or the in-vehicle navigation device 10 or the portable terminal 20 that is used by the vehicle 50 moves in conjunction with movement by the vehicle 50. Accordingly, in the following description, the vehicle 50, the in-vehicle navigation device 10, and the portable terminal 20 may be referred to as a "mobile body", as appropriate.

The vehicle travel information analysis device 30 can, based on travel information that includes consecutive items of position information and time information and is received from a plurality of vehicles 50 and without performing map matching or using a map in which link information is embedded, extract vehicle identification information (a mobile body ID) for a vehicle 50 that has traveled a road designated by a user. As a result, without performing processing that has a high load, without using an accurate road map in which link numbers have been set and which has a high cost burden, and even in a case where there is no accurate road map in which link numbers have been set, the vehicle travel information analysis device 30 can extract identification information for a vehicle that has traveled on a designated road.

The vehicle 50 is a mobile body that is ridden by the user to whom the portable terminal 20 belongs or the in-vehicle navigation device 10. The vehicles 50 are realized by, inter alia, a four-wheeled automobile and a motorcycle, for example.

The communication network 60 is realized by a network such as the internet or a mobile telephone network, or a network resulting from combining these. A LAN (Local Area Network) may be included in a portion of the network. Before describing the vehicle travel information analysis device 30, description is briefly given regarding the in-vehicle navigation device 10 and the portable terminal 20.

<In-Vehicle Navigation Device 10>

The in-vehicle navigation device 10 is supplied with power from the vehicle 50a and automatically activates by an ignition switch in the vehicle 50a being turned on (starting up the engine) by a user who is riding the vehicle 50a. The in-vehicle navigation device 10 operates until the ignition switch in the vehicle 50a is turned off (stopping the engine) by a user who is riding the vehicle 50a.

Figure 2:
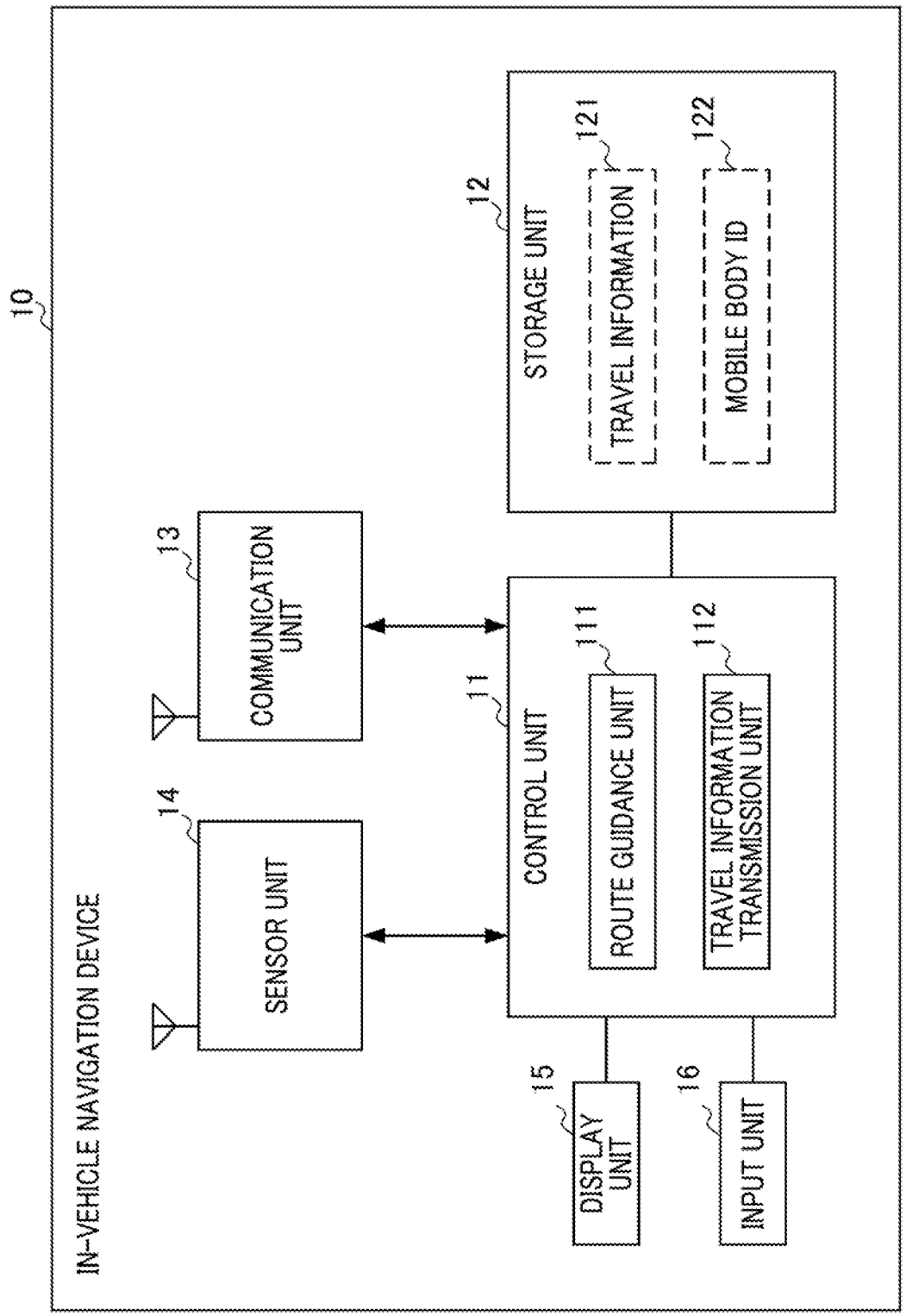
FIG. 2 is a functional block diagram illustrating a functional configuration of an in-vehicle navigation device in an embodiment according to the present invention.

As illustrated in FIG. 2, the in-vehicle navigation device 10 is configured by including a control unit 11, a storage unit 12, a communication unit 13, a sensor unit 14, a display unit 15, and an input unit 16.

The control unit 11 is configured from an arithmetic processing device such as a microprocessor, and controls each unit included in the in-vehicle navigation device 10. Details of the control unit 11 are described below.

The storage unit 12 is configured by, inter alia, a semiconductor memory, and stores various programs such as a control program referred to as firmware or an operating system, a program for performing a route guidance process, or a program for performing a process for transmitting travel information to the vehicle travel information analysis device 30, and also stores various items of information such as facility information for route guidance or map information that includes a facility ID.

As information stored by the storage unit 12, the figure illustrates travel information 121 and a mobile body ID 122, which are items of information pertaining in particular to the process for transmitting travel information. The travel information 121 includes position information (in other words, position information for the vehicle 50a) for the in-vehicle navigation device 10 that is positioned by the later-described sensor unit 14, and a time when the positioning was performed.

The mobile body ID 122 is information (vehicle identification information) for identifying the in-vehicle navigation device 10 or the vehicle 50a in which the in-vehicle navigation device 10 is installed. As the mobile body ID 122, it is possible to use, inter alia, a manufacturing number that is uniquely allocated to the in-vehicle navigation device 10, for example. It is also possible to use, as the mobile body ID 122, a telephone number assigned to a SIM (Subscriber Identity Module) inserted into the communication unit 13 in order for the communication unit 13 to connect to the communication network 60 which is a network such as a mobile telephone network. In addition, it is also possible to use, as the mobile body ID 122, a license plate number or a VIN (vehicle identification number) that is specifically assigned to the vehicle 50a.

The communication unit 13 has, inter alia, a DSP (Digital Signal Processor), and is compliant with a standard such as LTE (Long-Term Evolution), 4G (4th Generation), or 5G (5th Generation) or a standard such as Wi-Fi (registered trademark) in order to realize wireless communication with another device (for example, the vehicle travel information analysis device 30) via the communication network 60. For example, the communication unit 13 is used in order for the later-described travel information transmission unit 112 to transmit the travel information 121 and the mobile body ID 122, which are stored in the storage unit 12, to the vehicle travel information analysis device 30. However, there is no particular limitation on data that is transmitted or received between the communication unit 13 and another device, and travel information that includes position information and time information may include other sensor information to be used in analysis at the vehicle travel information analysis device 30—for example, acceleration, an accelerator position, and a steering angle—as well as information measured by the vehicle 50a such as progression direction information or progression speed information. In addition, it may be that information other than travel information and vehicle identification information (the mobile body ID 122) is transmitted and received.

The sensor unit 14 is configured by, for example, a Global Positioning System (GPS) sensor, a gyro sensor, an acceleration sensor, etc. The sensor unit 14 is provided with functionality which serves as a position detection means for detecting position information, and receives a GPS satellite signal via the GPS sensor, and positions position information (for example, latitude and longitude) for the in-vehicle navigation device 10. Positioning using the sensor unit 14 is performed at a predetermined time interval (for example, at an interval of three seconds) as described above. The positioned position information is stored in the storage unit 12 as the travel information 121 together with the positioned time information. Note that, because the GPS sensor can position elevation in addition to latitude and longitude, elevation may be included as position information in addition to latitude and longitude. Note that it is also possible for the sensor unit 14 to further improve the positioning accuracy of position information for the in-vehicle navigation device 10 based on an angular velocity or acceleration measured by a gyro sensor or an acceleration sensor. The display unit 15 is configured by a display device such as a liquid crystal display or an organic electroluminescence panel. The display unit 15 displays an image after receiving an instruction from the control unit 11. The input unit 16 is configured by, inter alia, an input device (illustration is omitted) such as physical switches referred to as a numeric keypad or a touch panel overlappingly provided on the display surface of the display unit 15. Note that, although illustration is not given, a speaker, microphone, or the like may also be provided. The speaker outputs audio to a driver, and the microphone collects, inter alia, speech emitted by the driver. As a result, it is possible to output information as audio from the speaker, or use speech recognition technology to input, to the control unit 11, various selections or instructions that were made by the driver as speech inputted via the microphone.

Next, details of the control unit 11 are described. The control unit 11 is configured by a microprocessor that has, inter alia, a CPU (Central Processing Unit), a RAM (Random-Access Memory), a ROM (Read-Only Memory), and an I/O (Input/Output). The CPU executes each program read out from the ROM or the storage unit 12, and at the time of execution thereof, for example reads out information from the RAM, ROM, and the storage unit 12, writes information to the RAM and the storage unit 12, and sends and receives signals to and from the communication unit 13, the sensor unit 14, the display unit 15, and the input unit 16. In this manner, hardware and software (programs) collaborate, whereby processing according to the present embodiment is realized.

The control unit 11 is provided with a route guidance unit 111 and a travel information transmission unit 112 as functional blocks.

The route guidance unit 111 is a portion that performs a process for giving route guidance to a destination such as a facility that was inputted or selected by a user and is well-known to a person skilled in the art, thus and detailed description thereof is omitted.

The travel information transmission unit 112 is a portion that uses wireless communication using the communication unit 13 to transmit the travel information 121 and the mobile body ID 122 stored in the storage unit 12 to the vehicle travel information analysis device 30.

Transmission of the travel information 121 and the mobile body ID 122 to the vehicle travel information analysis device 30 by the travel information transmission unit 112 is cyclically performed in a duration from when the ignition switch in the vehicle 50a is turned on (starting up the engine) by a user who is riding the vehicle 50a when driving starts and the in-vehicle navigation device 10 automatically activates, until when the ignition switch in the vehicle 50a is turned off (stopping the engine) when driving ends. For example, transmission is performed in real time each time the sensor unit 14 performs positioning at the predetermined time interval (for example, an interval of three seconds). In other words, transmission is performed in real time in a duration after driving starts at one time until the driving ends. It may be that, instead of transmitting to the vehicle travel information analysis device 30 in real time, a plurality of items of information are combined (for example, travel information 121 and the mobile body ID 122 which have been updated at an interval of three seconds over three minutes are combined) and transmitted at once. In other words, there may be so-called burst transmission. The length of the predetermined time interval, whether to transmit in real time, or whether to perform burst transmission can be discretionarily set in accordance with, inter alia, the environment in which the present embodiment is employed. In this manner, by performing real-time transmission or burst transmission, the travel information transmission unit 112 transmits, to the vehicle travel information analysis device 30, the mobile body ID 122 and the travel information 121 which are for identifying a travel route for the vehicle 50a that was positioned by the sensor unit 14.

In this case, it is possible to transmit a position identified using position information that was positioned immediately after the ignition switch is turned on (starting up the engine) and the in-vehicle navigation device 10 has automatically activated to the vehicle travel information analysis device 30 as an initial vehicle position for the driving, in other words as a departure position. Furthermore, it is possible to transmit a position identified using position information positioned immediately before the ignition switch is turned off (stopping the engine) to the vehicle travel information analysis device 30 as a final vehicle position for the driving, in other words as a parking position. For example, information indicating position information that represents a departure position or position information that represents a parking position (for example, flags indicating these are set to 1) is added to position information and then the travel information 121 is transmitted to the vehicle travel information analysis device 30. Note that position information positioned immediately before the ignition switch is turned off (stopping the engine) (in other words, a parking position) may be transmitted when the ignition switch is turned on (starting up the engine) and the in-vehicle navigation device 10 is reactivated.

Note that, in a case of performing burst transmission, for example, in a case where it is determined that the vehicle 50a has arrived at a destination such as a facility using the route guidance unit 111, the travel information transmission unit 112 can switch to transmitting in real time. In this manner, it is possible to prevent a situation in which, after arriving at a destination such as a facility and before position information for the destination such as a facility is transmitted, the ignition switch is turned off (stopping the engine) and the position information for the destination such as a facility is not transmitted to the vehicle travel information analysis device 30.

In addition, as described above, it may be that the travel information transmission unit 112 transmits to the vehicle travel information analysis device 30 after including, in the travel information 121, the acceleration of the vehicle 50a, the accelerator position, and the steering angle, as well as progression direction and speed information.

<Portable Terminal 20>

Figure 3:
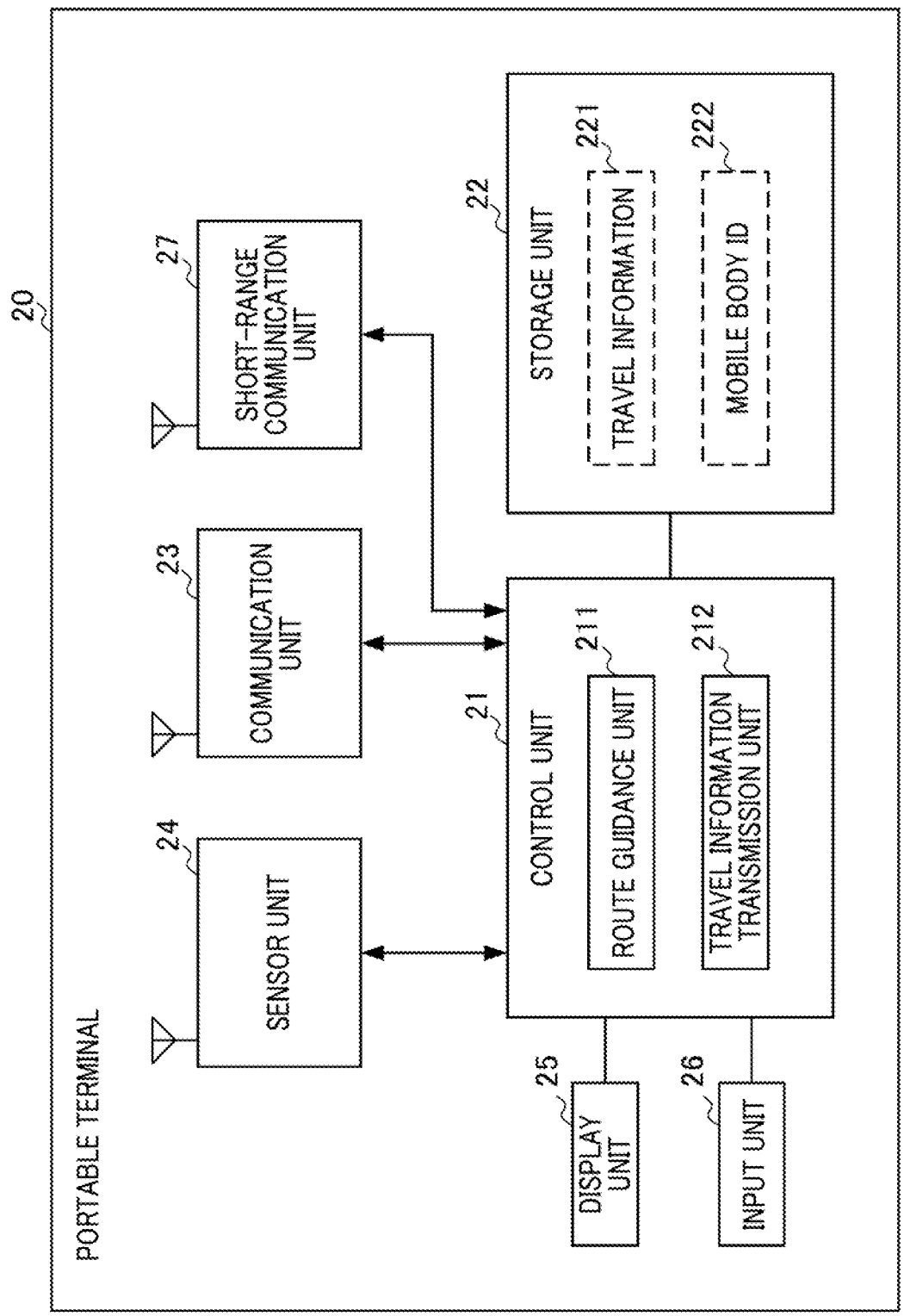
FIG. 3 is a functional block diagram illustrating a functional configuration of a portable terminal in an embodiment according to the present invention.

As illustrated in FIG. 3, the portable terminal 20 is configured by including a control unit 21, a storage unit 22, a communication unit 23, a sensor unit 24, a display unit 25, an input unit 26, and a short-range communication unit 27. Here, the control unit 21, the storage unit 22, the communication unit 23, the sensor unit 24, the display unit 25, and the input unit 26 have functionality equivalent to the functional blocks that have the same name and are included in the in-vehicle navigation device 10 described above. In other words, description for each functional block in the portable terminal 20 is achieved by replacing the language "in-vehicle navigation device 10" with "portable terminal 20" and replacing the language "vehicle 50a" with "vehicle 50b", in the description for the in-vehicle navigation device 10 which is described above, and thus duplicate subsequent description is omitted.

In contrast, because the portable terminal 20 differs from the in-vehicle navigation device 10 in, inter alia, including the short-range communication unit 27, this difference is described below. The short-range communication unit 27 is a portion that performs non-contact short-range communication compliant with a standard such as NFC (Near-Field Communication) or Bluetooth (registered trademark), or wired short-range communication via, inter alia, a USB (Universal Serial Bus) cable.

Meanwhile, the vehicle 50b is provided with a short-range communication unit for communicating with the short-range communication unit 27. For example, an ECU (Electronic Control Unit) in the vehicle 50b is provided with a short-range communication unit. A case where the portable terminal 20 can communicate with the ECU using short-range communication is, in other words, a case where the portable terminal 20 is present inside the vehicle 50b. In this case, position information positioned by the sensor unit 24 in the portable terminal 20 corresponds to position information for the vehicle 50b.

Accordingly, the portable terminal 20 causes a travel information transmission unit 212 to activate in a duration in which short-range communication with the ECU via the short-range communication unit 27 is possible. Similarly to the travel information transmission unit 112 in the in-vehicle navigation device 10, the activated travel information transmission unit 212 transmits, to the vehicle travel information analysis device 30, the mobile body ID 222 and the travel information 221 which are for identifying a travel route for the vehicle 50b that was positioned by the sensor unit 24.

For example, when a user is riding the vehicle 50b while possessing the portable terminal 20 and an activation switch in the vehicle 50b such as an ignition switch is turned on, the vehicle 50b and the portable terminal 20 are connected (paired), and subsequently the mobile body ID 222 and the position information positioned by the portable terminal 20 are transmitted from the portable terminal 20 to the vehicle travel information analysis device 30. Furthermore, when the activation switch in the vehicle 50b such as an ignition switch is turned off, pairing between the vehicle 50b and the portable terminal 20 is canceled.

Note that, in a case where the vehicle 50b has functionality for positioning position information, it may be that travel information 221 that includes position information positioned by the vehicle 50b instead of position information positioned by the sensor unit 24 is transmitted to the vehicle travel information analysis device 30. In this case, the sensor unit 24 may be omitted from the portable terminal 20.

<Vehicle Travel Information Analysis Device 30>

Figure 4:
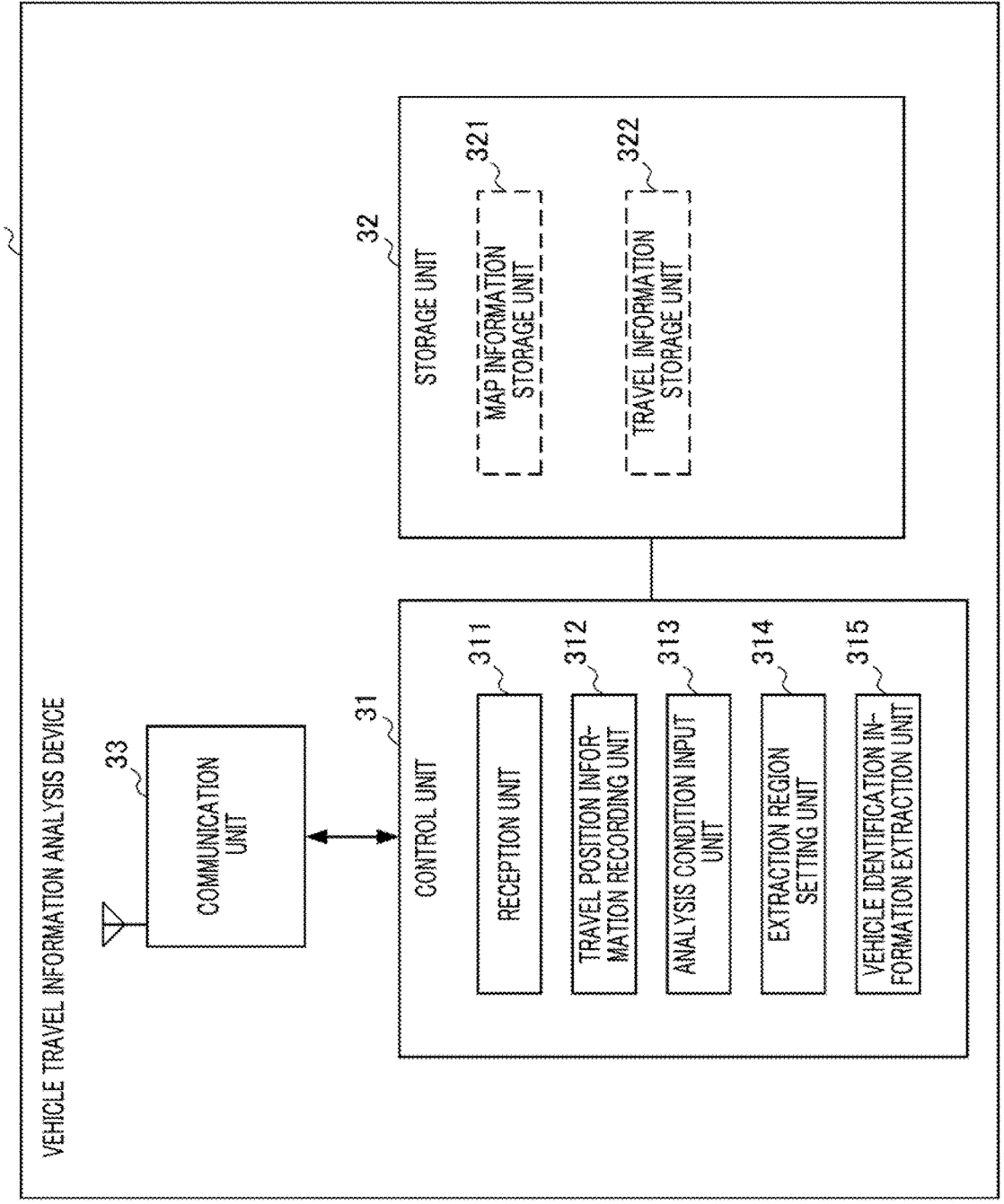
FIG. 4 is a functional block diagram illustrating a functional configuration of a vehicle travel information analysis device in an embodiment according to the present invention.

Next, with reference to the block view in FIG. 4, description is given regarding functional blocks that the vehicle travel information analysis device 30 is provided with.

As illustrated in FIG. 4, the vehicle travel information analysis device 30 is configured by including a control unit 31, a storage unit 32, and a communication unit 33.

The control unit 31 is configured from an arithmetic processing apparatus such as a microprocessor, and controls each unit included in the vehicle travel information analysis device 30. Details of the control unit 31 are described below.

The storage unit 32 is configured by, inter alia, a semiconductor memory, and stores various programs such as a control program referred to as firmware or an operating system or a program for performing a vehicle travel information analysis process, and also stores various items of information such as map information. As information stored by the storage unit 32, the figure illustrates a map information storage unit 321 that stores map information and a travel information storage unit 322 that stores position information for each vehicle 50, which are items of information pertaining to vehicle travel information analysis process.

In addition to map information, the map information stored in the map information storage unit 321 includes, inter alia, road information and map data for display that is for displaying a background such as a road map and roads. Note that, regarding a plurality of facilities, the map information may include, inter alia, facility identification information (facility IDs), facility names, facility types (and/or genres) pertaining to the types of facilities, telephone numbers, addresses, business hours, and center position information that indicates the central positions (for example, latitude and longitude information) of the facilities. Here, the facility type indicates a business category for a facility such as a convenience store, a hospital, or a car dealer, for example.

There may be a configuration in which the map information is stored in the map information storage unit 321 in advance, or there may be a configuration in which the map information is appropriately downloaded as necessary from, inter alia, a server device (illustration omitted) connected to the communication network 60. Furthermore, the map information may also be appropriately corrected in response to user input, etc.

The travel information storage unit 322 is a database that stores data that is received from the in-vehicle navigation device 10 and results from associating the travel information 121, which includes position information and positioned time information, with the mobile body ID 122, as well as data that is received from the portable terminal 20 and results from associating the travel information 221, which includes position information and positioned time information, with the mobile body ID 222. The travel information storage unit 322 is constructed and updated by each functional block included in the control unit 31. Details regarding the travel information storage unit 322 are described below.

Note that, in the following description, reference symbols are omitted and "travel information" is referred to when giving a description that does not distinguish between the travel information 121 and the travel information 221. In addition, the reference symbols are omitted and "mobile body IDs" are referred to when similarly giving a description that does not distinguish between the mobile body ID 122 and the mobile body ID 222.

The communication unit 33 has, inter alia, a DSP, and is compliant with a standard such as LTE (Long-Term Evolution), 4G (4th Generation), or 5G (5th Generation) or a standard such as Wi-Fi (registered trademark), in order to realize wireless communication or wired communication with another device (for example, the in-vehicle navigation device 10 and the portable terminal 20, etc.) via the communication network 60. For example, the communication unit 33 is used in order to receive travel information and a mobile body ID that are transmitted from each of the in-vehicle navigation device 10 and the portable terminal 20. However, there is no particular limitation on data transmitted and received between the communication unit 33 and another device, and information other that these items of information may be transmitted and received.

Next, details regarding the control unit 31 are described. The control unit 31 is, for example, configured by microprocessor having a CPU, RAM, ROM, I/O, etc. The CPU executes each program read out from the ROM or the storage unit 32, and at the time of execution thereof, reads out information from the RAM, ROM, and the storage unit 32, writes information to the RAM and the storage unit 32, and sends and receives signals to and from communication unit 33. In this manner, hardware and software (programs) collaborate, whereby processing according to the present embodiment is realized.

As functional blocks, the control unit 31 includes a reception unit 311, a travel information recording unit 312, an analysis condition input unit 313, an extraction region setting unit 314, and a vehicle identification information extraction unit 315.

<Reception Unit 311>

The reception unit 311 receives, via the communication unit 33, travel information, which includes consecutive items of position information and positioned time information, together with a mobile body ID from a plurality of vehicles 50.

<Travel Information Recording Unit 312>

The travel information recording unit 312 stores the travel information, which is from each vehicle 50 and was received using the reception unit 311, in the travel information storage unit 322 together with vehicle identification information (mobile body ID). Here, with reference to FIG. 5, description is given regarding an example of a data structure for the travel information storage unit 322. As illustrated in FIG. 5, the travel information storage unit 322 may store, for each vehicle 50, the "mobile body ID" and "travel information" received using the reception unit 311. Note that, as travel information transmitted from a vehicle, a direction of progression, speed information, or the like may be included in addition to consecutive items of position information and positioned time information from a vehicle 50.

The "mobile body ID" within the travel information storage unit 322 is, as described above, information for identifying the in-vehicle navigation device 10 or the portable terminal 20, which is the transmission source of the position information and the like, as well the vehicles 50 that are equipped with these. The "travel information" within the travel information storage unit 322 may be stored as all consecutive travel information received from a corresponding mobile body from when transmission of travel information and the like is started until the present. It becomes possible to use all the consecutive travel information to identify travel position information that includes a position being traveled through, a travel datetime, etc. Note that, in a case where a direction of progression and speed information is transmitted from a mobile body, a received direction of progression and speed information is stored in association with the position information and the time information.

<Analysis Condition Input Unit 313>

Via an input unit (not illustrated) configured by, inter alia, an input device (illustration omitted) such as a touch panel overlappingly provided on a display surface of a display unit (not illustrated) or physical switches referred to as a numeric keypad, for example, the analysis condition input unit 313 accepts, from a user who uses the vehicle travel information analysis system 1, designation of an analysis condition that includes information regarding an analysis target road. In addition, via a terminal (not illustrated) that is communicably connected via the communication unit 33, for example, the analysis condition input unit 313 may accept designation of an analysis condition that includes information regarding an analysis target road from a user. For example, the analysis condition input unit 313 accepts, as information regarding an analysis target road, identification information (for example, Japan National Route 1) for the analysis target road from a user. Note that it may be that a designation pertaining to a range of analysis target roads (a range from one location to another location) is accepted. Accordingly, as a method of designating, inter alia, identification information for an analysis target road, the analysis condition input unit 313 may display a list of road identification information on a display unit (not illustrated) or a terminal (not illustrated), for example, and, in a case where a specific road is designated by a user, allow the user to also input a range (two locations) for the road. In addition, as a method of designating, inter alia, identification information for an analysis target road, the analysis condition input unit 313 may display a road map on a display unit (not illustrated) or a terminal (not illustrated) that is provided with a touch panel, for example, and allow a user to (touch and thereby) designate two locations that will serve as both ends of an analysis target range for a road depicted on the road map. By a designation being made in the above manner, the later-described vehicle identification information extraction unit 315 can extract identification information for a vehicle that has traveled on an analysis target road, regardless of a travel direction such as inbound or outbound. Note that, when the later-described vehicle identification information extraction unit 315 extracts a vehicle that has traveled on an analysis target road, the analysis condition input unit 313 may accept from a user, via an input unit (not illustrated) or a terminal (not illustrated) and together with designation of the analysis target road, a time period (an analysis target time period) during which the vehicle traveled.

In addition, the analysis condition input unit 313 may accept, as an analysis condition and from a user, designation of travel direction information that indicates the direction of travel by a vehicle 50 on the analysis target road. As a result, the later-described vehicle identification information extraction unit 315 is able to extract only identification information for vehicles that have traveled the analysis target road in the inbound direction or only identification information for vehicles that have traveled in the outbound direction. For example, the analysis condition input unit 313 accepts, as information regarding an analysis target road, identification information (for example, Japan National Route 1) for the analysis target road from a user. Note that it may be that a designation pertaining to a range of analysis target roads (a range from one location to another location) is accepted. Accordingly, as a method of designating identification information and a travel direction for an analysis target road, the analysis condition input unit 313 may display a list of road identification information on a display unit (not illustrated), for example, and, in a case where a specific road is designated by a user, allow the user to also input a range (start point and end point) for the road. As a result, the analysis condition input unit 313 can accept the travel direction as a direction from the start point to the end point. In addition, as a method of designating identification information and a travel direction for an analysis target road, the analysis condition input unit 313 may display a road map on a display unit (not illustrated) that is provided with a touch panel, for example, and allow a user to (touch and thereby) designate a start point and an end point for an analysis target range for a road depicted on the road map. As a result, the analysis condition input unit 313 can accept the travel direction as a direction from the start point to the end point that were designated on the road map. The inbound direction or outbound direction is designated by a user in the above manner, whereby the later-described vehicle identification information extraction unit 315 can extract identification information for a vehicle that has traveled the analysis target road in the inbound travel direction or the outbound travel direction. Note that, when the later-described vehicle identification information extraction unit 315 extracts a vehicle that has traveled on an analysis target road, the analysis condition input unit 313 may accept from a user, via an input unit (not illustrated) and together with designation of the analysis target road and the travel direction, a time period (an analysis target time period) during which the vehicle traveled.

<Extraction Region Setting Unit 314>

The extraction region setting unit 314, based on designation of an analysis condition that has been accepted by the analysis condition input unit 313, selects a plurality of pass-through points on an analysis target road (for example, a range for an analysis target road that is designated by a user) that has been designated by a user. Note that a set of pass-through points includes two locations that indicate a start point and an end point, or both ends (two locations) indicating an analysis target road range. FIG. 6 illustrates an example of pass-through points and extraction regions that are set on an analysis target road. As illustrated in FIG. 6, when selecting pass-through points, the extraction region setting unit 314 makes a selection such that a straight line created by joining adjacent pass-through points is close to the analysis target road. In other words, the extraction region setting unit 314 selects a plurality of pass-through points such that it is possible to approximate the analysis target road using straight lines created by joining adjacent pass-through points. In addition, as illustrated in FIG. 6, the extraction region setting unit 314 sets, for each selected pass-through point, an extraction region that has a predetermined area and includes the pass-through point. For example, the extraction region setting unit 314 may set a rectangular or circular region for which one side or the diameter thereof is 20 to 50 m. In addition, more specifically, the extraction region setting unit 314 may set each extraction region to, for example, a rectangular shape that includes the corresponding pass-through point and is in alignment with the direction of the road. In this case, the extraction region setting unit 314 may set the length of one side of the rectangle corresponding to the road direction to a value resulting from adding GPS accuracy (in other words, error) to a value resulting from multiplying the speed of the vehicle 50 by a measurement time interval for the travel information (position information) received from the vehicle by the reception unit 311. For example, it becomes approximately 45 m in a case where it is assumed that GPS accuracy (in other words, error) is 10 m, the measurement time interval is 3 seconds, and the vehicle speed (average vehicle speed) is approximately 30 km/h (approximately 8.3 m/s). Note that the vehicle speed (average vehicle speed) differs in accordance with the road type (such as express motorway, national highway, prefectural road, or municipal road) of the analysis target road, for example, differs in accordance with weather such as heavy rain or snowfall, for example, and greatly differs in accordance with, inter alia, a degree of road congestion. Therefore, the extraction region setting unit 314 may allow a user to input these items of information that relate to the vehicle speed (average vehicle speed) to thereby set an extraction region having a predetermined area for each pass-through point. In addition, it may be that, in accordance with the road type, the vehicle speed (average vehicle speed) is set in advance (for example, 80 km/h for an expressway, 40 to 50 km/h for a national road, 30 km for a municipal road, etc.). In addition, the extraction region setting unit 314 may set the length of one side corresponding to the direction of a road width to a value resulting from adding GPS accuracy (in other words, error) to the road width. The extraction region setting unit 314 may calculate the road width in accordance with, inter alia, the road type of the analysis target road and the number of lanes on the analysis target road. Note that the extraction region setting unit 314 may allow a user to input, via an input unit (not illustrated) or a terminal (not illustrated), a determined width (the length of two sides in the case of a rectangle) for each predetermined extraction region that includes a pass-through point, for example.

In addition, the extraction region setting unit 314 uses an index (i) to identify each pass-through point that was set to the analysis target road. Specifically, letting the number of pass-through points be N, the index for one location from among both ends of the analysis target road or the start point of the analysis target road is set to 1 to achieve pass-through point (1). Next, the analysis target road is followed from the pass-through point (1), whereby the pass-through point set following the pass-through point (1) is set to the pass-through point (2), and subsequently the pass-through points (i) are similarly identified, and the other location from among both ends of the analysis target road or the end point of the analysis target road is setting to a pass-through point (N), whereby all pass-through points are identified using the index i ($1 \leq i \leq N$). In addition, the extraction region that includes the pass-through point (i) is set to the extraction region (i), whereby the extraction regions are identified using the index i ($1 \leq i \leq N$). The extraction region setting unit 314 can convert positions included in each extraction region (i) to latitude and longitude coordinate values, for example, that correspond to the positions to thereby set the extraction region (i) as a set of latitude and longitude coordinate values. Below, unless otherwise noted, the extraction region (i) indicates a set of latitude and longitude coordinate values included in the region.

<Vehicle Identification Information Extraction Unit 315>

Firstly, the vehicle identification information extraction unit 315 extracts identification information for vehicles having a record of travel information in each extraction region (i) ($1 \leq i \leq N$) respectively set to a plurality of locations on a road map by the extraction region setting unit 314. Note that it may be assumed that vehicles travel on the analysis target road on the same day without crossing over days. Accordingly, for each day included in an analysis target time period designated by a user, the vehicle identification information extraction unit 315 may extract identification information (mobile body ID) for a vehicle that has a record of travel information in each extraction region (i). Accordingly, in the following description, unless otherwise noted, it is assumed that identification information (mobile body ID) for a vehicle having a travel information record for each extraction region (i) is extracted, in association with a day ("analysis target date") included in the analysis target time period. In this manner, for each extraction region (i) ($1 \leq i \leq N$), a set {mobile body ID} (i) ($1 \leq i \leq N$) of mobile body IDs having travel information records is calculated. Specifically, the vehicle identification information extraction unit 315 extracts all identification information (mobile body IDs) for vehicles for which travel information (position information) is included in the extraction region (i) and for which the vehicle travel information (time information) stored in the travel information storage unit 322 corresponds to the analysis target date to thereby calculate the set {mobile body ID} (i) ($1 \leq i \leq N$) of mobile body IDs having a travel information record, for each extraction region (i) ($1 \leq i \leq N$). Next, the vehicle identification information extraction unit 315 extracts mobile body IDs included in the entirety of the set {mobile body ID} (i) ($1 \leq i \leq N$) of mobile body IDs having a travel information record corresponding to each of the extraction regions (i) ($1 \leq i \leq N$), and creates a set {mobile body ID (j); ($1 \leq j \leq M$)} of mobile body IDs having a travel information record in all extraction regions (i) ($1 \leq i \leq N$). In other words, {mobile body ID (j); ($1 \leq j \leq M$)} is a product set of {mobile body ID} (i) ($1 \leq i \leq N$). Note that M is set to the number of mobile body IDs included in the set {mobile body ID (j); ($1 \leq j \leq M$)} of mobile body IDs having a travel information record in all extraction regions (i) ($1 \leq i \leq N$).

As a result, it is possible to extract identification information (mobile body IDs) for vehicles that have traveled the analysis target road. Next, for each mobile body ID (j) ($1 \leq j \leq M$) included in the abovementioned product set, the vehicle identification information extraction unit 315 extracts time information (i, j) for each extraction region (i), and extracts travel information going in a direction (referred to as an "inbound direction") from the pass-through point (1) to the pass-through point (N) and travel information going in a direction (referred to as an "outbound direction") from the pass-through point (N) to the pass-through point (1).

The vehicle identification information extraction unit 315 can extract travel information going in the inbound direction or the outbound direction for each mobile body ID (j), as follows. The vehicle identification information extraction unit 315 determines, based on the time information for the mobile body ID (j), whether it is possible to line up the times (i, j) in each extraction region (i) for the mobile body ID (j) in chronological order for the inbound direction such that the time (1, j)<time (2, j)<time (3, j)< . . . <time (N, j). In a case where lining up in chronological order in the inbound direction was possible, the vehicle identification information extraction unit 315, based on this time series information, can extract the mobile body ID (j) as identification information for a vehicle that has traveled the analysis target road in the inbound direction and extract travel information in the inbound direction for the mobile body ID (j). Note that, in a case where the mobile body ID (j) has a plurality of travel information records in each extraction region (i), it may be that the vehicle identification information extraction unit 315, in a case where by combining the times (i, j) there are combinations for which lining up in chronological order in the inbound direction is possible, extracts the mobile body ID (j) as identification information for a vehicle that has traveled the analysis target road in the inbound direction and, based on the combinations, extracts travel information in the inbound direction for the mobile body (j) Conversely, the vehicle identification information extraction unit 315 determines, based on the time information for the mobile body ID (j), whether it is possible to line up the time (i, j) in each extraction region (i) for the mobile body ID (j) in chronological order for the outbound direction such that the time (1, j)>time (2, j)>time (3, j)> . . . >time (N, j). In a case where lining up in chronological order in the outbound direction was possible, the vehicle identification information extraction unit 315, based on this time series information, can extract the mobile body ID (j) as identification information for a vehicle that has traveled the analysis target road in the outbound direction and extract travel information in the outbound direction for the mobile body ID (j). Note that, in a case where the mobile body ID (j) has a plurality of travel information records in each extraction region (i), it may be that the vehicle identification information extraction unit 315, in a case where by combining the times (i, j) there are combinations for which lining up in chronological order in the outbound direction is possible, extracts the mobile body ID (j) as identification information for a vehicle that has traveled the analysis target road in the inbound direction and, based on the combinations, extracts travel information in the outbound direction for the mobile body ID (j). Note that, hypothetically, in a case where it is not possible to line up the times (i, j) for each extraction region (i) for the mobile body ID (j) in chronological order for either of the inbound direction and the outbound direction, the vehicle identification information extraction unit 315 can determine that the vehicle having the mobile body ID (j) is not traveling the analysis target road in either of the inbound direction or the outbound direction. Such a case can exceptionally occur in, inter alia, a case where there is, for example, a merging point with another road between adjacent pass-through points and, for example, the same vehicle has turned onto the other road from the merging point after traveling on the analysis target road in the inbound direction from the start point thereof and subsequently the same car has turned onto the other road from the merging point after traveling on the analysis target road in the outbound direction from the end point thereof. Accordingly, it may be that, when selecting pass-through points, the previously-described extraction region setting unit 314 makes a selection such that a merging point with another road is not included between adjacent pass-through points. In the above manner, the vehicle identification information extraction unit 315 can extract identification information for a vehicle for which the chronological order of time information included in travel information matches travel direction information (inbound direction or outbound direction), said identification information being the mobile body (j) (vehicle) that has a chronological order matching the travel direction information and has a record of travel information in each extraction region (i). As a result, the vehicle travel information analysis device 30 can obtain a vehicle that has traveled the analysis target road in the inbound direction or the outbound direction, as well as travel information therefor. FIG. 7 is a view that exemplifies travel information (time information) for each pass-through point (extraction region) for each mobile body in a case where three pass-through points (extraction regions) are set on an analysis target road. As illustrated in FIG. 7, it is possible to determine that the mobile body ID: A and the mobile body ID: B have traveled the analysis target road in the inbound direction, determine that the mobile body ID: C has not traveled the analysis target road, and determine that the mobile body ID: D has traveled the analysis target road in the outbound direction. As above, an extraction region having a predetermined area is set at each of a plurality of locations for the analysis target road on the road map by the extraction region setting unit 314, and the vehicle identification information extraction unit 315 can, based on the extraction regions and vehicle travel information, perform a simple process to thereby extract identification information for a vehicle that has traveled the analysis target road.

The previously-described vehicle identification information extraction unit 315 can extract identification information (mobile body ID) for a vehicle that has a record of travel information in all extraction regions respectively set to a plurality of locations (pass-through points) on the road map by the extraction region setting unit 314 to thereby extract identification information (mobile body ID) for a vehicle that has traveled the analysis target road. Vehicles, which have traveled the analysis target road and for which time series data for travel information (time information) for the vehicles matches the inbound direction or outbound direction for the analysis target road, are determined to have respectively traveled the analysis target road in the inbound direction or the outbound direction, whereby identification information (mobile body ID) for vehicles that have traveled the analysis target road in the inbound direction or identification information (mobile body ID) for vehicles that have traveled the analysis target road in the outbound direction are extracted. In contrast to this, in a case where the reception unit 311 can receive a direction of progression by a mobile body (vehicle) as travel information for the mobile body (vehicle), the vehicle identification information extraction unit 315 may, based on the directions of progression by vehicles included in travel information, extract identification information (mobile body ID) for vehicles that have traveled the analysis target road in the inbound direction or identification information (mobile body ID) for vehicles that have traveled the analysis target road in the outbound direction.

Figure 8:
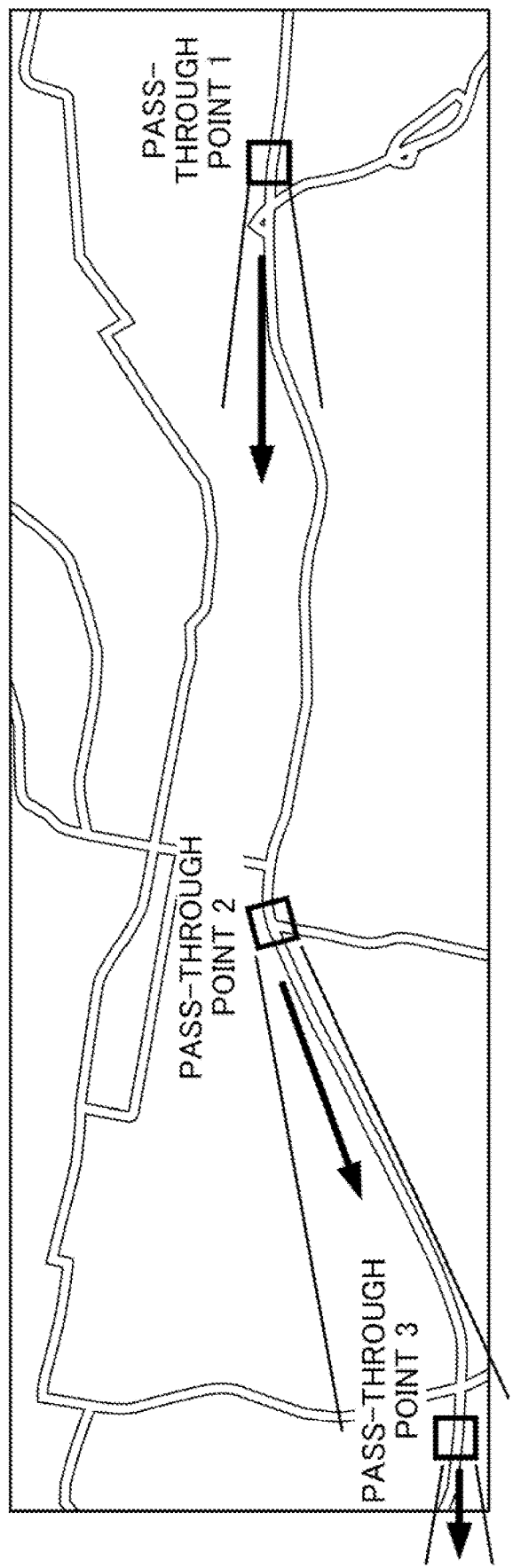
FIG. 8 is a view that exemplifies a condition for the direction of progression by a vehicle matches the inbound direction for an analysis target road, in an embodiment according to the present invention.

Firstly, description is given regarding a case of extracting identification information (mobile body ID) for a vehicle that has traveled the analysis target road in the inbound direction. It is assumed that the vehicle identification information extraction unit 315 extracts identification information (mobile body ID) for a vehicle having a travel information record for each extraction region (i), in association with a day ("analysis target date") included in the analysis target time period. However, the vehicle identification information extraction unit 315 extracts only identification information (mobile body IDs) for vehicles for which the direction of progression by the vehicle included in the travel information matches the inbound direction. In this manner, for each extraction region (i) (1≤i≤N), a set {mobile body ID}'(i) (1≤i≤N) of mobile body IDs that have travel information records and for which the vehicle progression direction matches the inbound direction is extracted. Next, the vehicle identification information extraction unit 315 extracts mobile body IDs included in the entirety of the set {mobile body ID}'(i) (1≤i≤N) of mobile body IDs having a travel information record (progression direction matching the inbound direction) corresponding to each extraction region (i) (1≤i≤N), and creates a set {mobile body ID (j); (1≤j≤M)}' of mobile body IDs having a travel information record (progression direction matches inbound direction) in all extraction regions (i) (1≤i≤N). In other words, {mobile body ID (j); (1≤j≤M)}' is a product set of {mobile body ID}'(i) (1≤i≤N). Note that M is set to the number of mobile body IDs included in the set {mobile body ID (j); (1≤j≤M)}' of mobile body IDs having a travel information record (progression direction matches the inbound direction) in all extraction regions (i) (1≤i≤N). As a result, it may be that identification information (mobile body IDs) for vehicles that have traveled the analysis target road in the inbound direction are extracted. A process for extracting identification information (mobile body ID) for a vehicle that has traveled the analysis target road in the outbound direction is described by replacing "progression direction matches inbound direction" with "progression direction matches outbound direction" in the above description. Note that description is given in detail regarding a condition by which the direction of progression by a vehicle matches the inbound direction (or outbound direction) for an analysis target road. FIG. 8 is a view that exemplifies a condition for the direction of progression by a vehicle matches the inbound direction for an analysis target road. Referring to FIG. 8, in a case where the direction of progression by a vehicle is less than or equal to (or less than) a preset predetermined angle (threshold) with respect to a straight line that connects a corresponding pass-through point (i) with the next pass-through point (i+1), the vehicle identification information extraction unit 315 determines that the direction of progression by the vehicle matches the inbound direction for the analysis target road. It is similar regarding the outbound direction. Accordingly, in a case where the direction of progression by a vehicle with respect to the straight line joining a corresponding pass-through point (i) with the next pass-through point (i+1) exceeds (or is greater than or equal to) the preset predetermined angle (threshold) as illustrated in FIG. 8, the vehicle is excluded from vehicles for which the vehicle progression direction included in travel information matches the inbound direction. As a result, the vehicle identification information extraction unit 315 may define the set {mobile body ID (j); (1≤j≤M)} of mobile body IDs that have a record (direction of progression matches inbound direction) of travel information in all extraction regions (i) (1≤i≤N) as the set of identification information (mobile body ID) for vehicles that have traveled the analysis target road in the inbound direction. By achieving the variation as above, the vehicle identification information extraction unit 315 can, based on the extraction regions and travel information for vehicles (directions of progression by the vehicles), perform a simple process to thereby extract identification information of a vehicle that has traveled the analysis target road. Note that, for caution's sake, it may be confirmed that the times (i, j) for the mobile body ID (j) extracted in this manner in each extraction region (i) are in chronological order (ascending order in the case of the inbound direction and descending order in the case of the outbound direction). Description was given above regarding the configuration of each functional unit in the vehicle travel information analysis device 30, which is exemplified as the present embodiment.

Operation in Accordance with the Present Embodiment

Next, with reference to flow charts in FIGS. 9 and 10, description is given regarding operation according to the present embodiment. Here, FIG. 9 is a flow chart that illustrates operation in a case where the vehicle identification information extraction unit 315 extracts identification information for vehicles having a travel information record in each extraction region (i) (1≤i≤N) respectively set at a plurality of locations on a road map. Here, FIG. 10 is a flow chart that illustrates operation in a case where the vehicle identification information extraction unit 315 extracts identification information for vehicles, which have a travel information record in each extraction region (i) (1≤i≤N) respectively set at a plurality of locations on a road map and for which the direction of progression by the vehicle included in the travel information matches a designated travel direction. Note that an operating process by which the vehicle travel information analysis device 30 (the reception unit 311 and the travel information recording unit 312) receives, from each vehicle 50, identification information position information, time information, etc. for the vehicle 50, and creates and updates the travel information storage unit 322 is publicly known to a person skilled in the art and it is assumed that, for the operation flows in FIG. 9 and FIG. 10, travel information for a plurality of vehicles has been recorded in the travel information storage unit 322.

With reference to FIG. 9, in step S10, the vehicle travel information analysis device 30 (the analysis condition input unit 313) accepts, from a user, an analysis condition that includes analysis target road information. Note that, in the following description, it is assumed that designations pertaining to the range of the analysis target road on a road map (a range from one location to another location) and a travel direction on the analysis target road (inbound direction or outbound direction) has been accepted.

In step S11, the vehicle travel information analysis device 30 (the extraction region setting unit 314) selects a plurality of pass-through points (i) (1≤i≤N) on the analysis target road accepted in step S10 and, for each of the selected pass-through points (i), sets an extraction region (i) that has a predetermined area. Note that it is assumed below that the index (i) is set based on the travel direction. In other words, setting is performed such that the direction pass-through point (1)→pass-through point (2)→ . . . →pass-through point (N−1)→pass-through point (N) matches the designated travel direction (inbound or outbound).

In step S12, the vehicle travel information analysis device 30 (vehicle identification information extraction unit 315), for each extraction region (i) (1≤i≤N), extracts all items of identification information for vehicles having a record of travel information (in other words, travel information for which the time information is a time during the analysis target date and the position information is included in the extraction region (i)) and, for each extraction region (i) (1≤i≤N), calculates the set {mobile body ID} (i) (1≤i≤N) of mobile body IDs that have a record of travel information.

In step S13, the vehicle travel information analysis device 30 (vehicle identification information extraction unit 315)

calculates, based on the set {mobile body ID} (i) (1≤i≤N) of mobile body IDs calculated in step S12, the product set {mobile body ID (j); (1≤j≤M)} for {mobile body ID} (i) (1≤i≤N). In other words, the vehicle travel information analysis device 30 (vehicle identification information extraction unit 315) extracts the mobile body IDs included in all of {mobile body ID} (i) (1≤i≤N) corresponding to the extraction region (i) (1≤i≤N) to thereby calculate the set {mobile body ID (j); (1≤j≤M)} of mobile body IDs having a record a travel information in all extraction regions (i) (1≤i≤N) (M is the number of mobile body IDs having a record of travel information in all extraction regions (i) (1≤i≤N)).

In step S14, the vehicle travel information analysis device 30 (vehicle identification information extraction unit 315) initializes j (j=1).

In step S15, the vehicle travel information analysis device 30 (vehicle identification information extraction unit 315) determines, based on the time information for the mobile body ID (j), whether travel information (in particular, the time information (i, j)) included in each extraction region (i) for the mobile body ID (j) belonging to the set {mobile body ID (j); (1≤j≤M)} that was calculated in step S13 and is for mobile body IDs having a record of travel information in all extraction regions (i) (1≤i≤N) can be lined up in a chronological order that corresponds to the designated travel direction, such that the time (1, j)<time (2, j)<time (3, j)< . . . <time (N, j). In a case where lining up is possible (case of Yes), step S16 is transitioned to. In a case where lining up is not possible (case of No), step S17 is transitioned to.

In step S16, the mobile body ID (j) is extracted as identification information for a vehicle that has traveled in the designated direction for the analysis target road.

In step S17, j is incremented by 1. In step S18, it is determined whether j>M. In a case where j>M, step S19 is transitioned to. In a case where j≤M, step S15 is transitioned to. In step S19, the vehicle travel information analysis device 30 (vehicle identification information extraction unit 315) defines, as a set of identification information for vehicles that have traveled the analysis target road in the designated direction, a set configured from the mobile body ID (j) extracted in step S16 as the identification information of a vehicle that has traveled the analysis target road in the designated direction. As a result of the above, the vehicle travel information analysis device 30 can extract data regarding vehicles that have traveled the designated analysis target road without performing map matching and without using a map into which link information has been embedded.

Next, with reference to the flow chart depicted in FIG. 10, description is given regarding operation in a case where the vehicle identification information extraction unit 315 extracts identification information for vehicles, which have a travel information record in each extraction region (i) (1≤i≤N) respectively set at a plurality of locations on a road map and for which the direction of progression by the vehicle included in the travel information matches a designated travel direction.

With reference to FIG. 10, step S20 and step S21 are for performing operations similar to step S10 and step S11. In step S22, the vehicle travel information analysis device 30 (vehicle identification information extraction unit 315), for each extraction region (i) (1≤i≤N), extracts all items of identification information for vehicles which have a record of travel information (in other words, travel information for which the time information is a time during the analysis target date and the position information is included in the extraction region (i)) and for which the progression direction included in the travel information matches the designated direction for the analysis target road, and, for each extraction region (i) (1≤i≤N), calculates the set {mobile body ID}'(i) (1≤i≤N) of mobile body IDs which have a record of travel information and for which the progression direction matches the designated travel direction.

In step S23, the vehicle travel information analysis device 30 (vehicle identification information extraction unit 315) calculates, based on the set {mobile body ID}'(i) (1≤i≤N) of mobile body IDs calculated in step S22, the product set {mobile body ID (j); (1≤j≤M)} for {mobile body ID}'(i) (1≤i≤N). In other words, the vehicle travel information analysis device 30 (vehicle identification information extraction unit 315) extracts the mobile body IDs included in all of {mobile body ID}'(i) (1≤i≤N) corresponding to the extraction region (i) (1≤i≤N) to thereby calculate the set {mobile body ID (j); (1≤j≤M)} of mobile body IDs which have a record a travel information in all extraction regions (i) (1≤i≤N) (and include a condition that the direction of progression matches the designated direction for the analysis target road) (M is the number of mobile body IDs having a record of travel information in all extraction regions (i) (1≤i≤N) (including a condition that the direction of progression matches the designated direction for the analysis target road)). In step S24, the vehicle travel information analysis device 30 (vehicle identification information extraction unit 315) defines the mobile body IDs included in {mobile body ID (j); (1≤j≤M)} calculated in this manner as identification information for vehicles that have traveled the analysis target road in the designated direction. As a result of the above, the vehicle travel information analysis device 30 can extract data regarding vehicles that have traveled the designated analysis target road without performing map matching and without using a map into which link information has been embedded. Note that, it may be that a step S25 is provided in the flow described above, and the vehicle travel information analysis device 30 (vehicle identification information extraction unit 315) confirms that time information (i, j) (1≤i≤N) for M mobile body IDs (j) respectively passing through the extraction region (i) are in chronological order, whereby mobile body IDs that do not achieve chronological order are deleted if present.

By virtue of the present embodiment described above, it becomes possible to provide a vehicle travel information analysis device and a vehicle travel information analysis method that are for extracting data regarding vehicles that have traveled a designated road, by providing coordinate points (pass-through points) and regions that have a predetermined area and include the coordinate points (pass-through points) at a plurality of locations on a road map in association with a designated analysis target road and data regarding vehicles for which position information has been recorded at the plurality of regions is extracted, and without performing map matching or using a map into which link information has been embedded.

<Hardware and Software>

Note that each device included in the above-described navigation system can be realized by hardware, software, or a combination of hardware and software. A navigation method performed by each device included in the above-described navigation system collaborating can be realized by hardware, software, or a combination of hardware and software. Realization by software means realization by a computer reading a program and executing the program.

It is possible for a program to be stored using various types of non-transitory computer-readable mediums, and supplied to a computer. A non-transitory computer-readable medium includes various types of tangible storage mediums. Examples of a non-transitory computer-readable medium include a magnetic recording medium (for example, a floppy disk, magnetic tape, or a hard disk drive), a magneto-optical recording medium (for example, a magneto-optical disk), a CD-ROM (read-only memory), a CD-R, a CD-R/W, or a semiconductor memory (for example, a mask ROM, a PROM (programmable ROM), an EPROM (erasable PROM), a flash ROM, or a RAM (random-access memory)). A program may be supplied to a computer by various types of transitory computer-readable mediums. Examples of transitory computer-readable mediums include an electrical signal, an optical signal, and electromagnetic waves. The transitory computer-readable medium can supply the program to the computer via a wired communication channel such as an electrical wire or an optical fiber, or via a wireless communication channel.

The embodiment described above is a suitable embodiment according to the present invention, but the scope of the is not limited to only the embodiment described above. The present invention can be worked in an aspect resulting from applying various changes within a scope that does not deviate from the substance of the present invention.

First Variation

For example, functional configurations in FIGS. 2, 3, and 4 are merely examples, and do not limit functional configurations according to the present embodiment. In other words, it is sufficient if functionality which can be executed by taking a series of processing pertaining to vehicle travel information analysis functionality according to the present invention as a whole is provided in respective devices, and how functional blocks are used in order to realize this functionality is not limited to the examples in FIGS. 2, 3, and 4 in particular. The embodiment described above may also be modified as with the variations described below, for example. Note that it may also be that the variations described below are combined.

Second Variation

In the embodiment described above, the vehicle travel information analysis device 30 was described as being realized by, inter alia, one server apparatus, but it may be that respective functions of the vehicle travel information analysis device 30 are distributed to an appropriate plurality of server apparatuses, and the vehicle travel information analysis device 30 is realized as a distributed processing system. Respective functions of the vehicle travel information analysis device 30 may also be realized using, inter alia, virtual server functions in a cloud.

Third Variation

In the embodiment, the vehicle travel information analysis device 30 has a configuration for receiving, from each vehicle 50, identification information, position information, time information, etc. for the vehicle 50 via the communication unit 33. Furthermore, configuration is such that the reception unit 311 and the travel information recording unit 312 create and update, as appropriate, the travel information storage unit 322 based on the identification information, position information, time information, etc. received from each vehicle 50. In contrast to this, it may be that, for example, an FCD (Floating Car Data) server (tentative name) is provided separately from the vehicle travel information analysis device 30, and the FCD server receives, from each vehicle 50, the identification information, position information, time information, etc. for the vehicle 50. In this case, the vehicle travel information analysis device 30 may obtain travel information for each vehicle from the FCD server to thereby create and update, as appropriate, the travel information storage unit 322 (movement transition).

EXPLANATION OF REFERENCE NUMERALS

1 Vehicle travel information analysis system
10 In-vehicle navigation device
11 Control unit
111 Route guidance unit
112 Travel information transmission unit
12 Storage unit
13 Communication unit
14 Sensor unit
20 Portable terminal
21 Control unit
211 Route guidance unit
212 Travel information transmission unit
22 Storage unit
23 Communication unit
24 Sensor unit
30 Vehicle travel information analysis device
31 Control unit
311 Reception unit
312 Travel information recording unit
313 Analysis condition input unit
314 Extraction region setting unit
315 Vehicle identification information extraction unit
32 Storage unit
321 Map information storage unit
322 Travel information storage unit
33 Communication unit
50, 50a, 50b Vehicle
60 Communication network

The invention claimed is:

1. A vehicle travel information analysis device, comprising:
  a map information storage configured to store map information that includes a road map;
  a travel information storage configured to store travel information for a vehicle; and
  a controller,
  wherein the controller is provided with
  a receiver configured to receive, from a plurality of vehicles, travel information that includes position information and time information,
  a travel information recorder configured to store, in the travel information storage, the travel information received by the receiver together with vehicle identification information,
  an analysis condition inputter configured to accept, from a user, a designation of an analysis condition that includes information regarding an analysis target road,
  an extraction region setter configured to, based on the designation of the analysis condition accepted by the analysis condition inputter, set an extraction region that has a predetermined area to each of a plurality of locations on the road map, and
  a vehicle identification information extractor configured to extract the Identification information for the vehicles having a record of the travel information in all of the extraction regions that were respectively set to the plurality of locations on the road map by the extraction region setter.

2. The vehicle travel information analysis device according to claim 1, wherein
the analysis condition inputter further
accepts, as the analysis condition, a designation of travel direction information that indicates a travel direction on the analysis target road, and
the vehicle identification information extractor further
extracts identification information for the vehicle for which a chronological order of the time information included in the travel information matches the travel direction information, said vehicle having a chronological order that matches the travel direction information and having a record of the travel information in each extraction region.

3. The vehicle travel information analysis device according to claim 1, wherein
the receiver further
receives, from the plurality of vehicles, the travel information that includes progression direction information indicating a direction of progression by the vehicle,
the analysis condition inputter further
accepts, as the analysis condition, a designation of travel direction information that indicates a travel direction on the analysis target road, and
the vehicle identification information extractor further
extracts identification information for the vehicle for which progression direction information included in travel information matches the travel direction Information, said vehicle having the travel information that matches the travel direction information in each extraction region.

4. The vehicle travel information analysis device according to claim 1, wherein
the analysis condition inputter further
designates information regarding the analysis target road by accepting, from a user, designation of road identification information as the analysis condition.

5. The vehicle travel information analysis device according to claim 1, wherein
the analysis condition inputter further
designates information regarding the analysis target road by accepting, from a user, designation of a start point and an end point of a road that is depicted on the road map as the analysis condition.

6. A vehicle travel information analysis method executed by one or more computers that include
a map information storage configured to store map information that includes a road map and
a travel information storage configured to store travel information for a vehicle,
the method comprising:
a receiving step of receiving, from a plurality of vehicles, travel information that includes position information and time information;
a travel information recording step of storing, in the travel information storage, the travel information received in the receiving step together with vehicle identification information;
an analysis condition input step of accepting, from a user, a designation of an analysis condition that includes information regarding an analysis target road;
an extraction region setting step of setting, based on the designation of the analysis condition accepted in the analysis condition input step, an extraction region that has a predetermined area to each of a plurality of locations on the road map; and
a vehicle identification information extraction step of extracting the identification information for the vehicles having a record of the travel information in all of the extraction regions that were respectively set to the plurality of locations on the road map in the extraction region setting step.

* * * * *